United States Patent [19]
Matsumura et al.

[11] Patent Number: 4,660,440
[45] Date of Patent: Apr. 28, 1987

[54] DEVICE FOR CONTROLLING CONTINUOUSLY VARIABLE TRANSMISSION

[75] Inventors: Toshio Matsumura; Katsunori Oshiage, both of Yokosuka, Japan

[73] Assignee: Nissan Motor Co., Ltd., Yokohama, Japan

[21] Appl. No.: 619,479

[22] Filed: Jun. 11, 1984

[30] Foreign Application Priority Data

Jun. 16, 1983 [JP] Japan .................. 58-106639

[51] Int. Cl.⁴ ............................................. B60K 41/12
[52] U.S. Cl. ........................................ 74/866; 74/856; 74/868
[58] Field of Search ............... 74/866, 856, 864, 868, 74/733, 731, 732; 474/18; 364/424.1; 192/3.58

[56] References Cited

U.S. PATENT DOCUMENTS

| | | | |
|---|---|---|---|
| 4,174,641 | 11/1979 | Hillman | 474/18 X |
| 4,349,088 | 9/1982 | Ito et al. | 74/733 X |
| 4,393,732 | 7/1983 | Suzuki et al. | 74/866 |
| 4,431,095 | 2/1984 | Suga | 192/3.58 X |
| 4,449,618 | 5/1984 | Suga et al. | 192/3.58 X |
| 4,457,410 | 7/1984 | Suga et al. | 192/3.58 X |
| 4,475,416 | 10/1984 | Underwood | 474/18 X |
| 4,495,576 | 1/1985 | Ito | 74/866 X |
| 4,499,979 | 2/1985 | Suzuki et al. | 192/3.58 X |
| 4,509,124 | 4/1985 | Suzuki et al. | 74/866 X |
| 4,510,822 | 4/1985 | Yamamuro et al. | 74/733 |
| 4,522,086 | 6/1985 | Haley | 474/18 X |
| 4,526,557 | 7/1985 | Tanaka et al. | 474/18 |
| 4,579,021 | 4/1986 | Yamamuro et al. | 74/868 |

FOREIGN PATENT DOCUMENTS

| | | | |
|---|---|---|---|
| 0080546 | 7/1981 | Japan | 74/866 |
| 57-161359 | 10/1982 | Japan | . |
| 57-161362 | 10/1982 | Japan | . |
| 57-161346 | 10/1982 | Japan | . |

*Primary Examiner*—Allan D. Herrmann
*Assistant Examiner*—David Novais
*Attorney, Agent, or Firm*—Schwartz, Jeffery, Schwaab, Mack, Blumenthal & Evans

[57] ABSTRACT

Operation of a shift actuator system is monitored and a lock-up clutch in a torque converter or a fluid coupling is released when a shift operation monitoring signal has stayed unchanged for a predetermined time or the shift operation monitoring signal has stayed unchanged after a change in a shift command signal fed to the shift actuator system.

9 Claims, 7 Drawing Figures

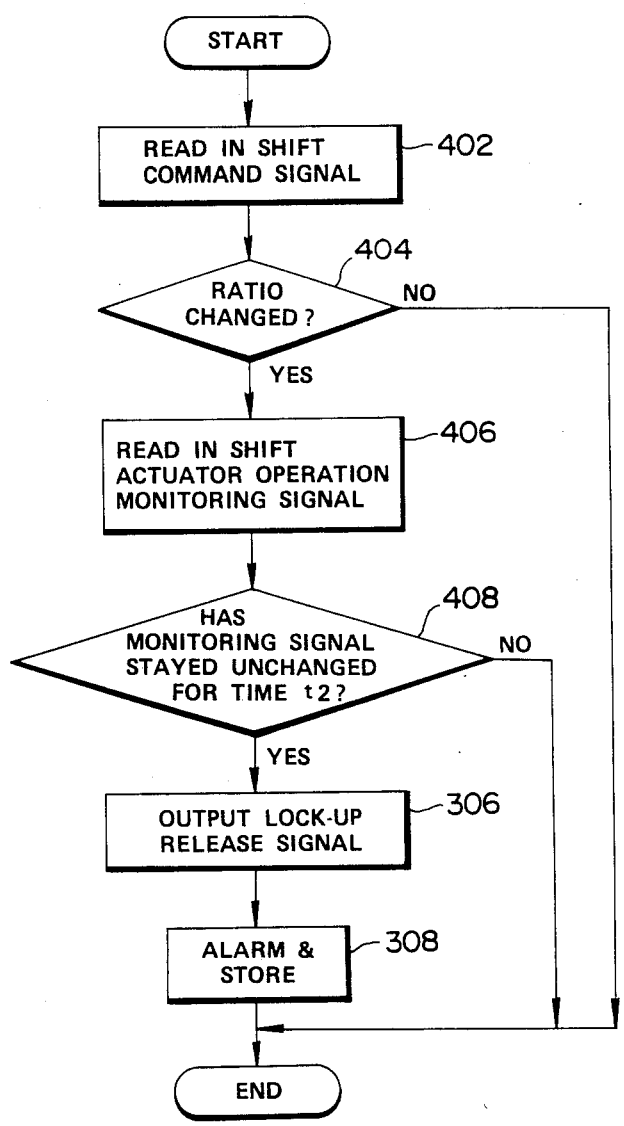

DEVICE FOR CONTROLLING CONTINUOUSLY VARIABLE TRANSMISSION

CROSS-REFERENCE TO RELATED APPLICATIONS

U.S. patent application Ser. No. 361,491 (now U.S. Pat. No. 4,510,822) filed Mar. 26, 1982, which U.S. application has a corresponding European patent application No. 82102531.9 published on Oct. 6, 1982 in European Patent Bulltein No. 82/40 under the publication No. 0061736.

U. S. patent application Ser. No. 362,489 (now U.S. Pat. No. 4,543,077) filed Mar. 26, 1982, which U.S. application has a corresponding European patent application No. 82102530.1 published on Oct. 6, 1982 in European Patent Bulletin No. 82/40 under the publication No. 0061735.

U.S. patent application Ser. No. 486,448 (now U.S. Pat. No. 4,515,040) filed Apr. 19, 1983, which U.S. application has a corresponding European patent application No. 83103772.6 filed Apr. 19, 1983. This U.S. application is hereby incorporated by reference in its entirety.

BACKGROUND OF THE INVENTION

The present invention relates to a device for controlling a continuously variable transmission and more particularly to a device for monitoring operation of the continuously variable transmission and releasing a lock-up device whenever an abnormal event takes place in a shift actuator system of the transmission.

Japanese patent application first publications Nos. 57-161359 and 57-161362 disclose a control device for a continuously variable transmission having a torque converter with a lock-up clutch, which Japanese publications correspond to the above mentioned U.S. patent application Ser. No. 361,491 now U.S. Pat. No. 4,510,822. According to this known control device, a shift valve is provided whereby when oil pressure in a drive pulley cylinder chamber is lower than a predetermined value, a lock-up device is released, while when the oil pressure is higher than the predetermined value, the lock-up device is engaged, for the purpose of releasing the lock-up device when a vehicle moves off from a standstill and accelerates rapidly. However, this control device is not provided with means for coping with a situation when abnormal event or trouble takes place in a shift actuator of the continuously variable transmission, so that if the shift actuator ceases its operation at a relatively small reduction ratio, the lock-up device is left engaged, causing the engine to stall, thereby disabling the vehicle running, or if the shift actuator ceases its operation at a relatively large reduction ratio, the engine will overrun, causing a damage on the engine.

SUMMARY OF THE INVENTION

According to the present invention, the operation of a shift actuator system of a continuously variable transmission is monitored and a lock-up device in a hydrodynamic transmission unit is released when a shift operation monitoring signal has stayed unchanged for a predetermined time or the shift operation monitoring signal has stayed unchanged after a change in a shift command signal fed to the shift actuator system.

An object of the present invention is to provide a control for a continuously variable transmission which releases a lock-up device of a hydrodynamic transmission unit should a shift actuator system become abnormal or break.

BRIEF DESCRIPTION OF DRAWINGS

FIG. 6 is a block diagram showing a third embodiment according to the present invention and FIG. 7 is a flow chart.

DETAILED DESCRIPTION OF THE INVENTION

First Embodiment

Hereinafter, the first embodiment is described based on FIGS. 1, 2, 3 and 4.

Figure 1:
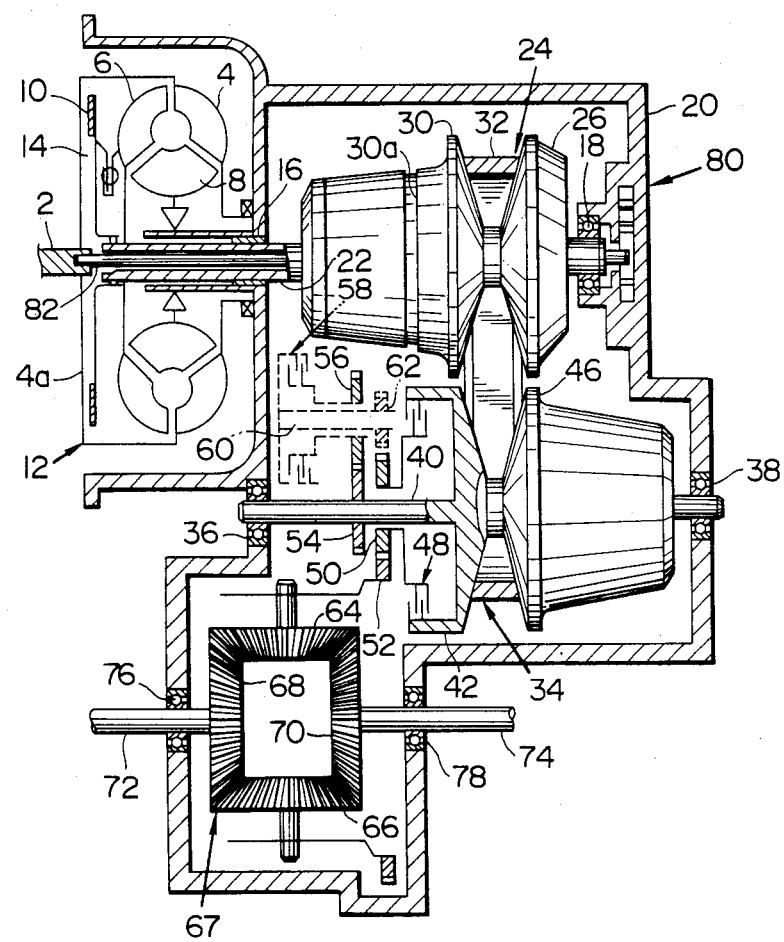
FIG. 1 is a schematic sectional view of a continuously variable transmission having a hydrodynamic transmission unit with a lock-up device.
Figure 2:
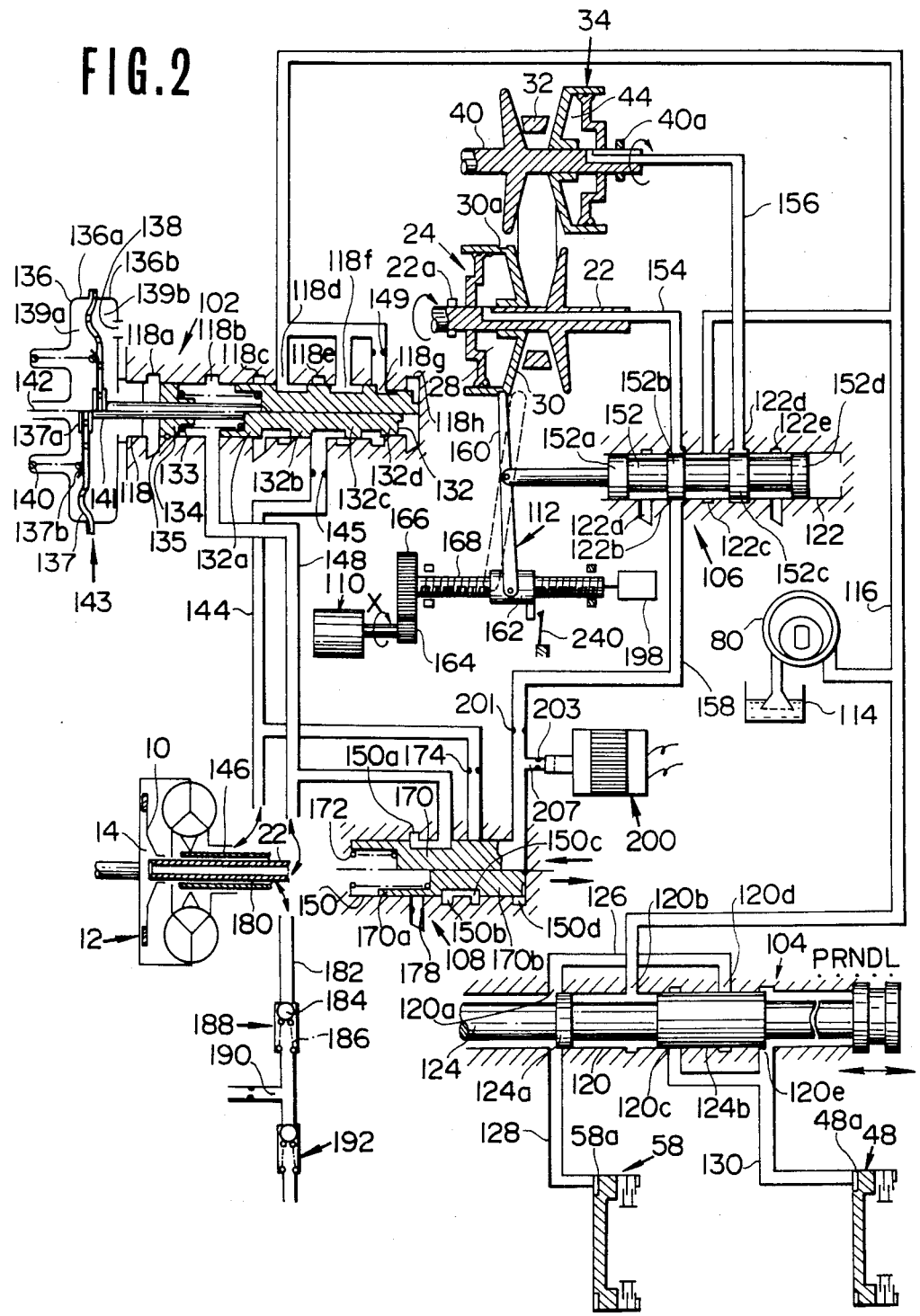
FIG. 2 is a circuit diagram showing a hydraulic pressure control system for the continuously variable transmission shown in FIG. 1.

FIGS. 1 and 2 show a power transmission mechanism of the continuously variable transmission and a hydraulic control system therefor, respectively.

The detailed description of FIGS. 1 and 2 is found in the before mentioned co-pending U.S. application Ser. No. 486,448, (now U.S. Pat. No. 4,515,040) corresponding to European patent application No. 83103772.6.

Briefly, the power transmission mechanism shown in FIG. 1 comprises an engine output shaft 2, a pump impeller 4, a turbine runner 6, a stator 8, a lock-up clutch 10, a torque converter 12, a lock-up clutch oil chamber 14, a bearing 16, a bearing 18, a case 20, a drive shaft 22, a drive pulley 24, a fixed conical disc 26, a movable conical disc 30, a V-belt 32, a driven pulley 34, a bearing 36, a bearing 38, a driven shaft 40, a fixed conical disc 42, a movable conical disc 46, a multiple plate forward clutch 48, a forward drive gear 50, a ring gear 52, a reverse drive gear 54, an idler gear 56, a multiple plate reverse clutch 58, an idle shaft 60, a pinion gear 62, a pinion gear 64, a pinion gear 66, a differential device 67, a side gear 68, a side gear 70, an output shaft 72, an output shaft 74, a bearing 76, a bearing 78, an oil pump 80, and an oil pump drive shaft 82.

Secured to the engine output shaft 2 is a torque converter 12 which comprises a pump impeller 4, a turbine runner 6, a stator 8 and lock-up clutch (lock-up device). The lock-up clutch 10 coupled to the turbine runner 6 in an axially slidable manner, defines a lock-up clutch oil chamber 14 in cooperation with an integral member 4a with the pump impeller 4, and the lock-up clutch 10 is adpated to be pressed against the member 4a to be rotatable therewith when the oil pressure in the lock-up clutch oil chamber 14 drops below oil pressure in the torque converter 12.

Referring to FIG. 2, the hydraulic control system comprises a line pressure regulator valve 102, a manual valve 104, a shift control valve 106, a lock-up shift valve 108, a shift motor 110 serving as a shift actuator, a shift operating mechanism 112, a tank 114, an oil conduit 116, a valve bore 118, ports 118a to 118h, a valve bore 120, ports 120a to 120e, a valve bore 122, ports 122a to 122e, a spool 124, lands 124a and 124b, an oil conduit 126, an oil conduit 128, a cylinder chamber 58a, an oil conduit 130, a cylinder chamber 48a, a spool 132, lands 132a to 132d, a spring 133, a spring seat 134, a pin 135, a case 136, a membrane 137, a metal fitting 137a, a spring seat 137b, a port 138, a chamber 139a, a chamber 139b, a spring 140, a rod 141, a port 142, a vacuum diaphragm 143, an oil conduit 144, an orifice 145, a torque converter inlet port 146, an oil conduit 148, a valve bore 150, ports 150a to 150d, a spool 152, lands 150a to 150d, a spool 152, lands 152a to 152e, an oil conduit 154, a drive pulley cylinder chamber 28, an oil conduit 156, a driven pulley cylinder chamber 44, an oil conduit 158, a lever 160, a sleeve 162, a gear 164, a gear 166, a shaft 168, a spool 170, lands 170a, 170b, a spring 172, an orifice 174, an orifice 178, a torque converter outlet port 180, an oil conduit 182, a ball 184, a spring 186, a relief valve 188, an oil conduit 190, a relief valve 192, a potentio meter 198, a solenoid 200, and a shift reference switch 240.

Hereinafter, the lock-up shift valve 108 and the shift motor 110 of a shift actuator system are described.

The lock-up shift valve 108 comprises a valve bore 150 having four ports 150a, 150b, 150c and 150d, a spool 170 with two lands 170a and 170b in the valve bore 150, a spring 172 biasing the spool 170 to the right as viewed in FIG. 2, and a solenoid 200 which is adapted to open or close an opening 207 communicating with the port 150d. The port 150d communicates with a port 122b of a shift control valve 106 by an oil conduit 158. The oil conduit 158 is provided with orifices 201, 203 and opening 207. The ports 150b and 150c communicate with ports 118b and 118e of a line pressure regulating valve 102, respectively, by respective oil conduits 148 and 144, and the port 150a is drained. Although the port 150c is supplied with the same pressure as that supplied to the torque converter inlet port 146, the port 150c is closed by the land 170b and the port 150b is drained via the port 150a when the spool 170 has been biased to the left against the spring 172 as a result that the pressure (i.e., the same pressure as that in the drive pulley cylinder chamber 28) acting in the conduit 158 becomes high when the opening 207 is closed by the solenoid 200. Thus, the lock-up clutch oil chamber 14 connected to the port 150b is drained, rendering the lock-up clutch 10 to assume its engaged state owing to the pressure within the torque converter 12, thereby allowing the torque converter to stay in a lock-up state thereof where the torque converter function ceases. In the case an oil pressure in the drive pulley cylinder chamber 28 lowers or in the case the opening 207 is opened by the solenoid 200, since a force urging the spool 170 to the left becomes less than a force urging the spool 170 to the right, the spool 170 moves to the right, thus allowing a port 150b to communicate with a port 150c. This causes an oil conduit 148 to be connected to an oil conduit 144, supplying a lock-up clutch oil chamber 14 with the same pressure as that in a torque converter inlet port 146, thus releasing the lock-up clutch 10 as the same oil pressure is exerted on the opposite faces of the lock-up clutch 10.

The shift motor 110 is coupled via gears 164, 166, shaft 168 and sleeve 162 to a lever 160 of a shift operating mechanism 112. Actuating the shift motor 110 will displace the lever 160, adjusting the transmission to a desired reduction ratio. The actuating state of the shift motor 110 is detected by a potentio meter 198 provided on the shaft 168. The potentio meter 198 may be replaced with a rotary encoder.

Figure 3:
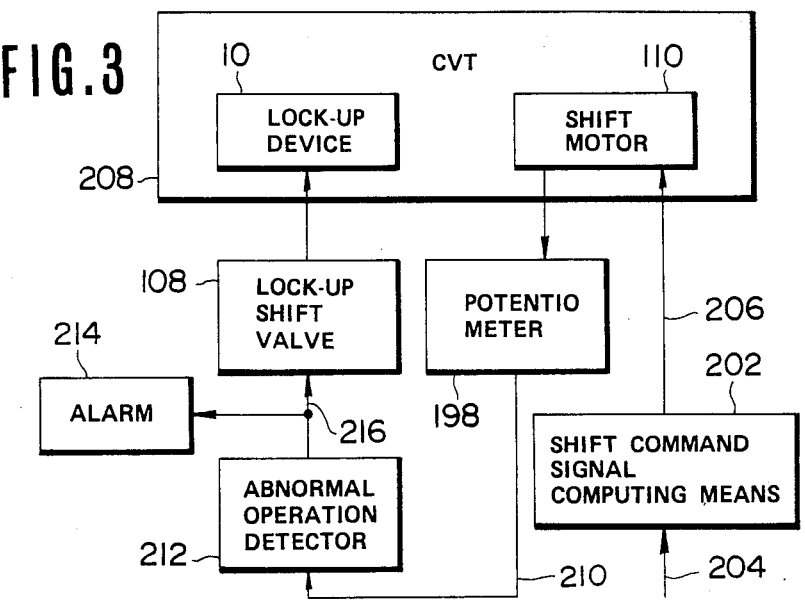
FIG. 3 is a block diagram showing a first embodiment of a device according to the present invention.

FIG. 3 is a block diagram showing a device according to the present invention. Referring to a shift command computing means 202, a computation is performed based on a various kinds of operating state indicative signals, which are generally denoted by a single reference numeral 204, fed thereto so as to provide a shift command signal 206 which commands a desired reduction ratio. The shift command signal 206 is in the form of stepper motor actuator shown in the copending U.S. application Ser. No. 486,448 now U.S. Pat. No. 4,515,040 and is fed to the shift motor 110. The shift motor 110 of a shift actuator system is actuated by this shift command signal 206 and adjusts an actual reduction ratio in the continuously variable transmission 208 to a desired reduction ratio. The actuating state of the shift motor 110 is detected by the potentio meter 198 in terms of the displacement of a movable member of the shift actuator system, such as a shaft 168 or movable conical disc 30 of the drive pulley 24. The output of the potentiometer 198 is fed to an abnormal operation detector 212 as a shift actuator operation monitoring signal 210. The abnormal operation detector 212 will not produce an output signal unless the signal 210 has stayed in the same value for a predetermined time. In the case the shift actuator operation monitoring signal 210 has stayed in the same value, the abnormal operation detector 212 sends a lock-up release signal to the solenoid 200, rendering same ON. When the solenoid 200 is turned ON, the lock-up shift valve 108 is always shifted to a lock-up release side, as previously described, thus releasing the lock-up clutch 10. When the abnormal operation detector 212 determines the abnormal state, a signal 216 is sent to an alarming means 214, and an alarm like a buzzer is produced and the occurrence of the abnormal state is memorized.

Figure 4:
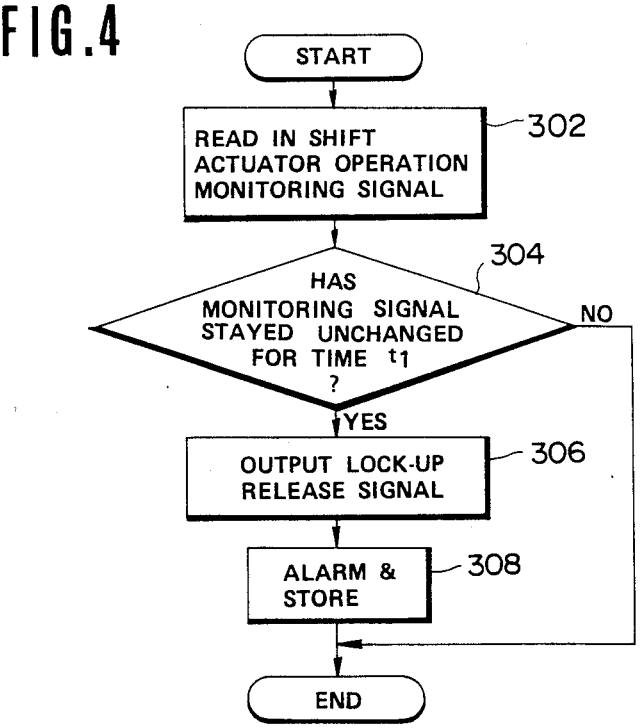
FIG. 4 is a flowchart.

The function of the abnormal operation detector 212 may be performed by a microcomputer along a flowchart shown in FIG. 4. First, the shift actuator operation monitoring signal 210 is read in (in a step 302). A determination is made whether this signal 210 has unchanged or stayed in the same value for a predetermined time t1 (in a step 304). If the signal 210 has not stayed in the same value for the predetermined time t1, the program returns, but if it has stayed in the same value for the predetermined time t1, a lock-up release signal 216 is produced (in a step 306). Subsequently, it is memorized that the alarm has been produced (in a step 308) before the program returns.

With the above mentioned control, the lock-up clutch 10 is always released whenever the shift motor 110 should become abnormal or break (i.e., whenever the shift motor 110 should cease to operate normally). It is to be understood that the shift motor 110 will not stay in the same position for a long time while the vehicle is running unless the shift motor 110 breaks. Thus, it will never happen that the determination of abnormal state of the shift motor 110 is made even if there occurs no such abnormal state. In the above manner, since the lock-up clutch 10 is always released whenever the shift motor 110 breaks up, the engine is prevented from overrun or stall, thereby enabling the vehicle to continue to run to a repair shop with the same reduction ratio established at the time of occurrence of abnormal state.

Second Embodiment

Figure 5:
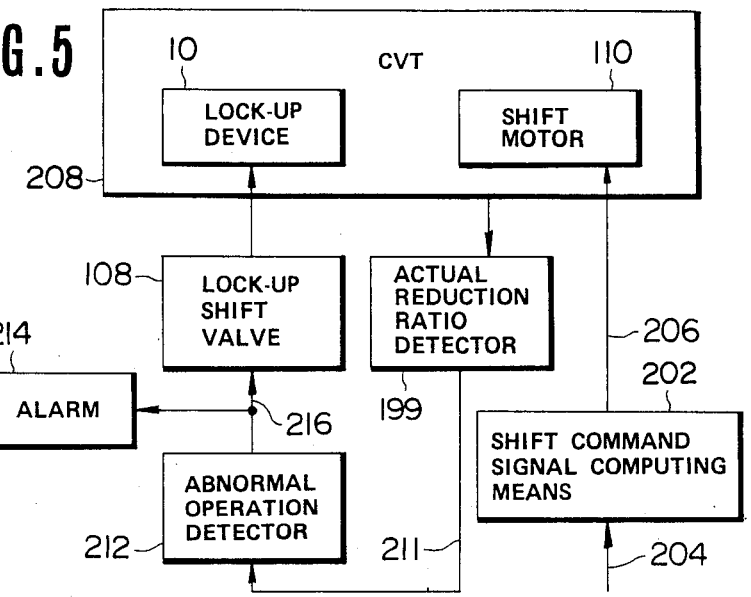
FIG. 5 is a block diagram showing a second embodiment according to the present invention.

FIG. 5 is a block diagram showing the second embodiment according to the present invention. Although, in the case of the first embodiment shown in FIG. 3, the potentio meter 198 is used to detect the operating state of the shift motor 110, an actual reduction ratio detector 199 is used in this second embodiment. That is, fed to the actual reduction ratio detector 199 are a drive pulley revolution speed and a driven pulley revolution speed and the actual reduction ratio is determined by computation based on these inputs. The actual reduction ratio signal 211 obtained by this computation is fed to an abnormal operation detector 212. The abnormal operation detector 212 determines that an abnormal state has occurred when, as mentioned before, the actual reduction ratio signal 211 has stayed in the same value for a predetermined time t1. The other construction is similar to the counterparts in FIG. 3. Since the actual reduction ratio in the continuously variable transmission stays in the same value if the shift motor 110 ceases to operate, the fact that the shift motor 110 has stayed in the same position for a predetermined time is equivalent to the fact that the actual reduction ratio does for the predetermined time. It follows that the second embodiment provides substantially the same operation and effect as those of the first embodiment.

Third Embodiment

Figure 6:
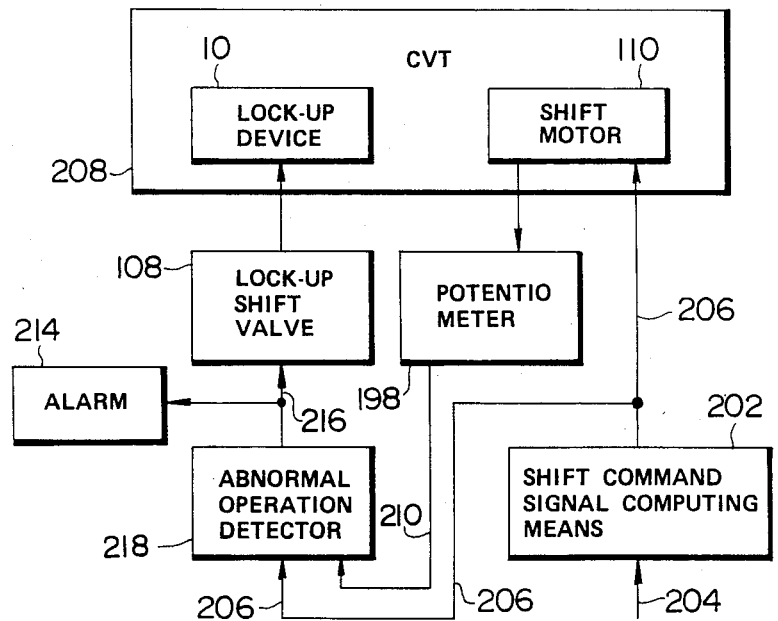

FIG. 6 is a block diagram showing the third embodiment which is different from the first embodiment in that a shift command signal 206 is fed to an abnormal operation detector 218 in addition to an output signal from a potentio meter 198. In the above mentioned first and second embodiments, the occurrence of the abnormal state was detected from the fact that the shift motor 110 has stayed in the same position for the predetermined time t1 or the fact that the actual reduction ratio has stayed in the same value for the predetermined time t1. As will be readily understood from FIGS. 6 and 7, it is possible to determine the occurrence of abnormal state by detecting the event where a shift actuator operation monitoring signal 210 has stayed unchanged for a predetermined time even though the shift command signal 206 has changed during the time. This eliminates the need to set the predetermined time long enought so as to cope with the vehicle ascending a steep slope with the maximum reduction ratio or decelerating with the minimum reduction ratio, and thus securely prevents the occurrence of regarding this state as abnormal state even if the predetermined time is not set sufficiently long. Thus, this allows a quick determination of abnormal state occurring during normal running without any delay.

Referring to FIG. 7, a shift command signal 206 is read in (in a step 402) and then a determination is made based on the shift command signal 206 whether a reduction ratio has changed or not (in a step 404). If the reduction ratio has not changed, the program returns, but if it has changed, a shift actuator operation monitoring signal 210 is read in (in a step 406). Thereafter, a determination is made whether the signal 210 has stayed unchanged for a predetermined time t2 (in a step 408). The time t2 is set shorter than the time t1 used in the first embodiment. If the signal 210 has not stayed in the same value for the predetermined time t2, the program returns, but if it has stayed in the same value for the predetermined time t1, a lock-up release signal 216 is produced (in a step 306). Subsequently, it is memorized that the alarm has been produced (in a step 308) before the program returns.

We claim:

1. A device for controlling a continuously variable transmission including a hydrodynamic transmission unit with a lock-up device shiftable between an engagement mode and a release mode, and a lock-up shift valve for shifting the lock-up device between the engagement mode and the release mode, comprising:
   means for generating a shift command signal;
   means for adjusting a reduction ratio in the continuously variable transmission in response to said shift command signal, said reduction ratio adjusting means including a shift actuator operatively coupled with said shift command generating means to be operative in response to said shift command signal;
   means for monitoring operation of the shift actuator and generating a shift operation monitoring signal indicative of the operation of said shift actuator; and
   means for detecting an abnormal operation of the shift actuator responsive to said shift operation monitoring signal and generating a lock-up release signal when said shift operation monitoring signal remains unchanged for a predetermined period after a predetermined condition has been satisfied, said lock-up release signal being fed to the lock-up shift valve so as to shift the lock-up device to the release mode.

2. A device as claimed in claim 1, wherein said predetermined condition is satisfied upon expiration of a predetermined time.

3. A device as claimed in claim 1, wherein said predetermined condition is satisfied upon expiration of a predetermined time after said shift command signal has changed.

4. A device as claimed in claim 1, wherein said monitoring means includes a potentiometer operatively coupled to the shift actuator.

5. A device as claimed in claim 1, wherein said monitoring means includes means for detecting an actual reduction ratio in the continuously variable transmission.

6. A method for controlling a continuously variable transmission including a hydrodynamic transmission unit with a lock-up device shiftable between an engagement mode and a release mode, a lock-up shift valve for shifting the lock-up device between the engagement mode and the release mode, comprising the steps of:
   generating a shift command signal;
   operating a shift actuator in response to said shift command signal and adjusting a reduction ratio in the continuously variable transmission;
   monitoring operation of the shift actuator and generating a shift operation monitoring signal indicative of the operation of said shift actuator; and
   detecting an abnormal operation of the shift actuator responsive to said shift operation monitoring signal and generating a lock-up release signal when said shift operation monitoring signal remains unchanged for a predetermined period after a predetermined condition has been satisfied, said lock-up release signal being fed to the lock-up shift valve so as to shift the lock-up device to the release mode.

7. A method as claimed in claim 6, wherein said abnormal operation detecting step comprises determining that said abnormal operation has occurred when said shift operation monitoring signal remains unchanged for a predetermined time.

8. A method as claimed in claim 6, wherein said abnormal operation detecting step determines that said abnormal operation progresses when said shift operation monitoring signal has stayed unchanged after a change in the shift command signal.

9. A method for detecting abnormal operation of a shift actuator of a shift actuator system in controlling a continuously variable transmission including a hydrodynamic transmission unit with a lock-up device shiftable between an engagement mode and a release mode, and a lock-up shift valve for shifting the lock-up device between the engagement mode and the release mode, comprising the steps of:

generating a shift command signal;

operating said shift actuator in response to said shift command signal to adjust a reduction ratio in the continuously variable transmission;

monitoring operation of said shift actuator and generating a shift operation monitoring signal indicative of the operation of said shift actuator; and determining, responsive to said shift command signal and said shift monitoring signal that an abnormal operation of said shift actuator has occurred when said shift operation monitoring signal remains unchanged for a predetermined time after occurrence of a change in said shift command signal, and generating a lock-up release signal; and shifting the lock-up device to the release mode in response to said lock-up release signal.

* * * * *